(12) United States Patent
Semerjyan et al.

(10) Patent No.: US 12,143,929 B2
(45) Date of Patent: Nov. 12, 2024

(54) WIRELESS NETWORK ALLOCATION IN TELEVISION CONTENT RECEIVER SYSTEMS

(71) Applicant: DISH Network L.L.C., Englewood, CO (US)

(72) Inventors: Aram Semerjyan, Aurora, CO (US); Eric Palmer, Denver, CO (US)

(73) Assignee: DISH Network L.L.C., Englewood, CO (US)

( * ) Notice: Subject to any disclaimer, the term of this patent is extended or adjusted under 35 U.S.C. 154(b) by 350 days.

(21) Appl. No.: 17/825,710

(22) Filed: May 26, 2022

(65) Prior Publication Data
US 2023/0388913 A1 Nov. 30, 2023

(51) Int. Cl.
*H04W 48/18* (2009.01)
*H04W 48/20* (2009.01)
*H04W 84/06* (2009.01)

(52) U.S. Cl.
CPC ........... *H04W 48/18* (2013.01); *H04W 48/20* (2013.01); *H04W 84/06* (2013.01)

(58) Field of Classification Search
CPC ...... H04W 48/18; H04W 48/20; H04W 84/06
See application file for complete search history.

(56) References Cited

U.S. PATENT DOCUMENTS

| | | | |
|---|---|---|---|
| 9,084,030 B1* | 7/2015 | Nijim | H04N 21/25808 |
| 2007/0220575 A1* | 9/2007 | Cooper | H04N 21/41415 |
| | | | 348/E7.071 |
| 2010/0077440 A1* | 3/2010 | Medina | H04N 21/658 |
| | | | 725/116 |
| 2012/0246313 A1* | 9/2012 | Ho | H04L 67/12 |
| | | | 709/225 |
| 2015/0199030 A1* | 7/2015 | Mikkola | G06F 3/0489 |
| | | | 345/157 |

* cited by examiner

*Primary Examiner* — Duc C Ho
(74) *Attorney, Agent, or Firm* — Kilpatrick Townsend & Stockton LLP

(57) ABSTRACT

Various arrangements for facilitating digital content in multi-network television receiver communication systems are provided. A general network access point can provide access to a general network. A private network access point can provide access to a private network. Credentials for accessing the private network are distributed by a primary television receiver configured to determine that a secondary television receiver is connected to the general network via the general network access point. In response, the primary television receiver transmits, via the general network, credentials configured to enable the secondary television receiver to access the private network via the private network access point to the secondary television receiver. The primary television receiver is further configured to transmit, via the private network, digital media content to the secondary television receiver.

20 Claims, 5 Drawing Sheets

WIRELESS NETWORK ALLOCATION IN TELEVISION CONTENT RECEIVER SYSTEMS

BACKGROUND

Television content receivers may receive and distribute digital content from remote content providers to locally networked television content receivers. Television content receivers may communicate via wired or wireless connections across one or more local networks with television content receivers to transmit, receive, and display the digital content. Providing functionalities to easily extend wireless networks when adding new television content receivers may improve user satisfaction and reduce technological complexities.

SUMMARY

Various embodiments are described related to a multi-network television receiver communication system. The system may comprise a general network access point configured to provide access to a general network. The system may further comprise a first private network access point configured to provide access to a first private network. The first private network and the general network may be different networks. In some embodiments, credentials for accessing the first private network are distributed by a primary television receiver. The system may further comprise a secondary television receiver connected to the general network via the general network access point. The secondary television receiver may be configured to receive digital media content. The system may further comprise a first primary television receiver coupled with the general network access point and the first private network access point. In some embodiments, the first primary television receiver is configured to determine that the secondary television receiver is connected to the general network via the general network access point. In response to determining that the secondary television receiver is connected to the general network, the first primary television receiver may be further configured to transmit, to the secondary television receiver via the general network, first credentials configured to enable the secondary television receiver to access the first private network via the first private network access point. The first primary television receiver may be further configured to transmit, via the first private network, the digital media content to the secondary television receiver.

Embodiments of such a system may further comprise a plurality of private network access points configured to provide access to a respective plurality of private networks. In some embodiments, a first subset of the plurality of private network access points comprises the first private network access point. Each private network access point of the first subset of the plurality of private network access points may be coupled with the first primary television receiver. In some embodiments, the first primary television receiver is further configured to receive network characteristics for a respective private network from each private network access point of the first subset of the plurality of private network access points. The first primary television receiver may be further configured to select, from the first subset of the plurality of private network access points, the first private network access point based on a comparison of the network characteristics received from each private network access point of the first subset of the plurality of private network access points. In some embodiments, the network characteristics include at least one network characteristic selected from the group consisting of: a signal strength at the secondary television receiver, a bandwidth of the private network access point, and a number of available connections to the private network access point.

In some embodiments, the system further comprises a plurality of primary television receivers. The plurality of primary television receivers may comprise the first primary television receiver and a second primary television receiver coupled with the general network access point and a second subset of the plurality of private network access points. The second primary television receiver may be configured to determine that the secondary television receiver is connected to the general network via the general network access point and transmit, to the secondary television receiver via the general network in response to detecting that the secondary television receiver is connected to the general network, second credentials configured to enable the secondary television receiver to access a second private network via a second private network access point of the second subset of the plurality of private network access points.

In some embodiments, the first credentials comprise first network characteristics for the first private network, the second credentials comprise second network characteristics for the second private network, and the secondary television receiver is further configured to compare the first network characteristics with the second network characteristics using one or more selection criteria to select the first private network. In some embodiments, the secondary television receiver is further configured to disconnect from the general network and connect to the first private network based on the comparison.

In some embodiments, the system further comprises a plurality of secondary television receivers configured to receive digital media content from a remote content provider via the first primary television receiver. The plurality of secondary television receivers may comprise the secondary television receiver.

In some embodiments, the system further comprises a satellite antenna communicatively coupled to the primary television receiver. The satellite antenna may be configured to provide a connection between the primary television receiver and a remote content provider. The primary television receiver may be further configured to receive the digital media content from the remote content provider. In some embodiments, the first primary television receiver comprises the general network access point, the first private network access point, or both. In some embodiments, the general network access point is a mobile device configured to provide access to the general network for a temporary time period. In some embodiments, the system further comprises a television communicatively coupled to the secondary television receiver. The secondary television receiver may be further configured to display the digital media content from the primary television receiver on the television.

Various embodiments are described related to a television receiver. The television receiver may comprise one or more processors and a non-transitory computer-readable storage medium storing instructions, which when executed by the one or more processors, cause the one or more processors to determine that a secondary television receiver is connected to a general network via a general network access point. The television receiver may be coupled with the general network access point. The instructions may further cause the one or more processors to transmit, to the secondary television receiver via the general network in response to determining that the secondary television receiver is connected to the general network, first credentials configured to enable the secondary television receiver to access a first private network via a first private network access point. The television receiver may be coupled with the first private network access point. The instructions may further cause the one or more processors to receive, from the secondary television receiver via the first private network, a request for digital media content from a remote content provider. The instructions may further cause the one or more processors to transmit, via the first private network, the digital media content from the remote content provider to the secondary television receiver.

In some embodiments, the instructions further cause the one or more processors to receive network characteristics for respective private networks provided by each private network access point of a plurality of private network access points comprising the first private network access point. In some embodiments, the instructions further cause the one or more processors to select the first private network access point based on a comparison of the network characteristics received from each private network access point of the plurality of private network access points.

In some embodiments, the network characteristics are received from a plurality of primary television receivers coupled with the television receiver. In some embodiments, determining that the secondary television receiver is connected to the general network comprises receiving, from the secondary television receiver via the general network, a request for private network access point credentials.

Various embodiments are described related to a method of facilitating delivery of television content in a multi-network television receiver communication system. The method may comprise connecting to a general network by a secondary television receiver via a general network access point. The method may further comprise determining, by a primary television receiver via the general network, that the secondary television receiver is connected to the general network. The primary television receiver may be connected to the general network via the general network access point. The method may further comprise transmitting, from the primary television receiver to the secondary television receiver via the general network, first credentials configured to enable the secondary television receiver to access a first private network via a first private network access point. In some embodiments, the general network and the first private network are different networks. Access to the first private network may be controlled by the primary television receiver. The method may further comprise connecting, by the secondary television receiver using the first credentials, to the first private network via the first private network access point. The method may further comprise transmitting digital content from the primary television receiver to the secondary television receiver via the first private network.

In some embodiments, the method further comprises receiving, by the primary television receiver, network characteristics for a respective private network from each of a plurality of private network access points. The plurality of private network access points may comprise the first private network access point. The method may further comprise selecting, from the plurality of private network access points, the first private network access point based on a comparison of the network characteristics received from each private network access point of the plurality of private network access points. In some embodiments, the first credentials configured to enable the secondary television receiver to access the first private network via the first private network access point are transmitted in response to selecting the first private network access point.

In some embodiments, the first credentials comprise first network characteristics for the first private network and the method further comprises receiving, by the secondary television receiver via the general network, second credentials configured to enable the secondary television receiver to access a second private network via a second private network access point. The second credentials may comprise second network characteristics for the second private network. The method may further comprise comparing, by the secondary television receiver, the first network characteristics with the second network characteristics using one or more selection criteria to select the first private network. The method may further comprise disconnecting, by the secondary television receiver, from the general network; and connecting, using the first credentials by the secondary television receiver, to the first private network via the first private network access point.

In some embodiments, the second credentials are received from a second primary television receiver. In some embodiments, the method further comprises receiving the digital content by the primary television receiver from a remote content provider via a satellite antenna. In some embodiments, the method further comprises transmitting the digital content from the secondary television receiver to a television coupled with the secondary television receiver.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
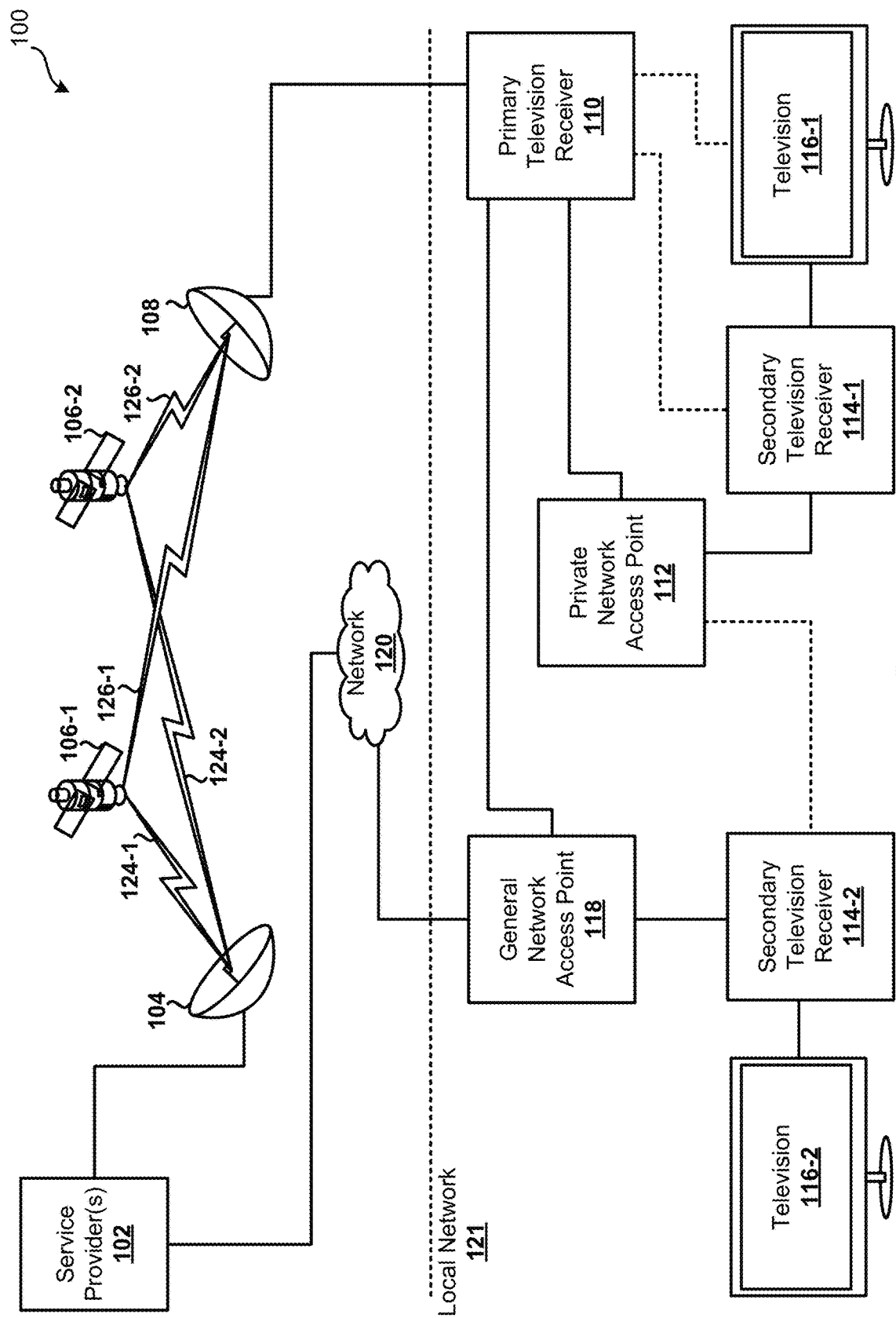
FIG. 1 illustrates an embodiment of a multi-network television receiver communication system.

Television content receivers can operate in various types of local computing environments that include wired and wireless local networks. In such arrangements, one or more primary and one or more secondary television receivers can be connected with such local networks. Primary television receivers may receive digital content from remote service providers via the Internet or satellite communication. In turn, primary television receivers may distribute the digital content to secondary television receivers via wired or wireless connections. Connecting primary television receivers wirelessly with secondary television receivers may involve establishing dedicated wireless networks through wireless network access points to which the secondary television receivers may connect. Depending on the size of the local computing environment, multiple wireless network access points may be used to extend the physical range of digital content distribution from a primary television receiver. Similarly, multiple primary television receivers may be used to expand the amount of digital content distribution.

However, increasing the number of primary television receivers or wireless network access points in a local computing environment may create several unique challenges, especially with respect to the wireless connection of additional secondary television receivers. First, as technology evolves, existing techniques for adding new devices to wireless networks, such as Wi-Fi Protected Setup (WPS), may no longer be supported by the preferred operating systems for television receivers and to maintain such compatibility may prove increasingly cumbersome and technically challenging as new operating system versions are released and software dependencies become more complex. Further, relying on users to select the best available wireless network access point to which a new television receiver should be connected may, at best, result in networks that are not optimized and, at worst, with inadequate signal strength and reception, leading to reduced customer satisfaction and/or the inability to reliably deliver content to the secondary receiver.

Embodiments detailed herein can deal with these challenges and others. By initially connecting the primary television receiver and a new secondary television receiver to a general network, such as a home or business Wi-Fi network, a mobile hotspot, or direct Ethernet connection, the primary television receiver can determine that the secondary television receiver is attempting to establish a wireless connection to the primary television receiver through a dedicated wireless network used by the primary television receiver to distribute digital content. After detecting the secondary television receiver, the primary television receiver may transmit credentials for a dedicated wireless network or wireless network access point to the secondary television receiver through the general network. In cases where there are multiple wireless network access points, the primary television receiver may automatically select the best wireless network access point for the secondary television receiver. After receiving the credentials from the primary television receiver, the secondary television receiver may proceed to disconnect from the general network and connect to the dedicated wireless network and begin receiving digital content from the primary television receiver through the dedicated wireless network.

Further detail regarding the allocation of wireless network access points and dedicated wireless networks is provided in relation to the figures. FIG. 1 illustrates an embodiment of a multi-network television receiver communication system. For brevity, system 100 is depicted in a simplified and conceptual form and may generally include more or fewer systems, devices, networks, and/or other components as desired. Further, the number and type of features or elements incorporated within system 100 may or may not be implementation-specific, and at least some of the aspects of system 100 may be similar to a cable television distribution system, an IPTV (Internet Protocol Television) content distribution system, and/or any other type of media or content distribution system.

System 100 may also include at least one network 120 that may facilitate bi-directional communication for data transfer between primary television receiver 110 and service provider(s) 102. Network 120 is intended to represent any number of terrestrial and/or non-terrestrial network features or elements. For example, network 120 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular network, or any other type of communication network within which data may be transferred between and among respective components of the system 100.

System 100 may also include at least one local network 121 that establishes a bi-directional communication path for data transfer between and among primary television receiver 110, private network access point 112, secondary television receivers 114, televisions 116, and general network access point 118. Local network 121 may correspond to a home or business computing environment. Primary television receiver 110, together with secondary television receivers 114 and televisions 116, may each be incorporated within or form at least a portion of a particular home or business computing network.

Primary television receiver 110 and secondary television receivers 114 may correspond to television receivers and/or television converters, such as a set-top box (STB) for example, or smart TV content receivers. In another example, primary television receiver 110 and secondary television receivers 114 may exhibit functionality integrated as part of or into a television; a DVR (Digital Video Recorder); a computer, such as a tablet computing device; or any other computing system or device, as well as variations thereof. Further, primary television receiver 110 may be enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-bandwidth Digital Content Protection). For example, as disclosed further herein, one or more of the various elements or components of the at least one local network 121 may communicate using TCP/IP using one or more wireless techniques, such as Wi-Fi; or wired techniques, such as Ethernet or MoCA® (Multimedia over Coax Alliance). Still other embodiments are possible.

In practice, satellites 106 may each receive uplink signals 124 from satellite uplink 104. In this example, each of uplink signals 124 may contain one or more transponder streams of particular data or content, such as one or more particular television channels, as supplied by service provider(s) 102. For example, each of the respective uplink signals 124 may contain various media content such as encoded HD (High Definition) television channels, SD (Standard Definition) television channels, on-demand programming, programming information, and/or any other content in the form of at least one transponder stream, in accordance with an allotted carrier frequency and bandwidth. In this example, different media content may be carried using different versions of satellites 106.

Satellites 106 may further relay uplink signals 124 to satellite dish 108 as downlink signals 126. Similar to uplink signals 124, each of downlink signals 126 may contain one or more transponder streams of particular data or content, such as various encoded and/or at least partially electronically scrambled television channels and/or on-demand programming, in accordance with an allotted carrier frequency and bandwidth. Downlink signals 126, however, may not necessarily contain the same or similar content as a corresponding one of uplink signals 124. For example, uplink signal 124-1 may include a first transponder stream containing at least a first group or grouping of television channels, and downlink signal 126-1 may include a second transponder stream containing at least a second, different group or grouping of television channels. In other examples, the first and second group of television channels may have one or more television channels in common. In sum, there may be varying degrees of correlation between uplink signals 124 and downlink signals 126, both in terms of content and underlying characteristics. Further, satellite television signals may be different from broadcast television or other types of signals. Satellite signals may include multiplexed, packetized, and modulated digital signals. Once multiplexed, packetized and modulated, one analog satellite transmission may carry digital data representing several television stations or service providers. Some examples of service providers include HBO®, CBS®, and/or ESPN®.

Satellite dish 108 may be provided to receive television channels (e.g., on a subscription basis) provided by service provider(s) 102, satellite uplink 104, and/or satellites 106. For example, satellite dish 108 may be receive particular transponder streams, or downlink signals 126, from one or more of satellites 106. As another example, satellite dish 108 may provide a plurality of television channel frequencies to a television frequency tuner of primary television receiver 110. Additionally, primary television receiver 110, which is communicatively coupled to satellite dish 108, may subsequently select via a tuner, decode, and relay particular transponder streams to television 116-1 for display thereon. For example, satellite dish 108 and primary television receiver 110 may, respectively, receive, decode, and relay at least one premium HD-formatted television channel to television 116-1. As another example, primary television receiver 110 may tune a television frequency tuner to a television channel frequency of a plurality of television channel frequencies received by satellite dish 108. Programming or content associated with the HD channel may generally be presented live, or from a recording as previously stored on, by, or at primary television receiver 110. Here, the HD channel may be output to television 116-1 in accordance with the HDMI/HDCP content protection technologies. However, other embodiments are possible. For example, the HD channel may be output to television 116-1 in accordance with the MoCA® (Multimedia over Coax Alliance) home entertainment networking standard.

Further, primary television receiver 110 may select via a tuner, decode, and relay particular transponder streams to one or both of secondary television receivers 114, which may in turn relay particular transponder streams to a corresponding television of televisions 116 for display thereon. For example, satellite dish 108 and primary television receiver 110 may, respectively, receive, decode, and relay at least one television channel to television 116-1 by way of secondary television receiver 114-1. Similar to the above-example, the television channel may be presented live, or from a recording as previously stored on primary television receiver 110, and may be output to television 116-1 by way of secondary television receiver 114-1 in accordance with a particular content protection technology and/or networking standard. Additionally, or alternatively, primary television receiver 110 may receive digital content from service provider(s) 102 via network 120. For example, while primary television receiver 110 may receive satellite television channels via satellite dish 108, primary television receiver 110 may also access network 120 via general network access point 118, as described below, to stream digital content from digital content providers such as Netflix®, Spotify®, Google®, and/or YouTube®, and relay the digital content to televisions 116 for display thereon. While described as streaming content, primary television receiver 110 may also transmit, receive, or otherwise have access to, other forms of data such as documents, databases, websites, email, search engine results, digital assistant interfaces, and the like.

Relaying transponder streams and/or digital content from primary television receiver 110 to televisions 116 via secondary television receivers 114 may include transmission via wireless communication. For example, the at least one local network 121 may include a private content network. Primary television receiver 110 may then transmit digital content to secondary television receivers 114 via the private content network. In some embodiments, the private content network may be established by private network access points, such as private network access point 112, to which primary television receiver 110 and secondary television receivers 114 are connected.

Private network access point 112 may function similar to a wireless router. For example, private network access point 112 may receive digital communication from primary television receiver 110 and route the digital communication to an intended recipient of either of secondary television receivers 114. Private network access point 112 may receive the digital communication via a wired connection from primary television receiver 110, such as via an Ethernet or MoCA® connection. Private network access point 112 may then transmit the digital communication to the appropriate secondary television receiver 114 via a wireless communication standard, such as Wi-Fi, Bluetooth®, ZigBee®, or the like. Additionally, private network access point 112 may receive wireless communication from either secondary television receiver 114 and relay the communication to primary television receiver 110 via a wired connection. For example, secondary television receiver 114-2 may transmit a request to primary television receiver 110 via private network access point 112 to select via a tuner, decode, and relay a different transponder stream.

As described further below, the at least one local network 121 may include one or more general networks or general purpose networks. General networks may function in a similar manner, or for a similar purpose, as home or business local area networks configured to provide network access to a wide array of electronic devices for general purpose computing, such as email, web-browsing, and the like. General network access point 118 may establish, or otherwise provide access to, the general network. For example, general network access point 118 may be a wired or wireless router or switch device configured to receive and distribute data from and to various devices coupled with it and/or between other networks, such as network 120. After connecting to general network access points 118, the various electronic devices may transmit and/or receive data via the general network. In some embodiments, a general network is defined as a network which a user explicitly authorizes devices to use for communication by providing a password and SSID, or other access credentials. In contrast, access to private networks, such as those described below, may be managed by a device such as primary television receiver 110, and users may be otherwise unable to directly provide access credentials to such a network.

In some embodiments, the at least one local network 121 includes both general networks and private content networks, such as described above, to de-conflict between the various purposes of each network and/or to provide dedicated resources for one or more specific purposes. For example, due to any of a number of concerns including bandwidth, security, and/or privacy, one or more private content networks may be established separate and apart from general networks to provide dedicated networking communications between secondary television receivers 114 and primary television receiver 110. This may be the case when, for example, primary television receiver 110 is relaying data intensive content, such as one or more 4K video streams, for display to one or more televisions 116 via secondary television receiver 114. In some embodiments, access to private content networks may be reserved for devices that receive, distribute, and display, digital content from service provider(s) 102, such as primary television receiver 110 and secondary television receivers 114.

In some embodiments, primary television receiver 110 may be coupled with both general network access point 118 and private network access point 112. For example, primary television receiver 110 may provide a connection to general network access point 118 and network 120 for secondary television receivers 114 and/or televisions 116 while simultaneously providing digital content from satellite dish 108 to private network access point 112 for distribution to secondary television receivers 114 and/or televisions 116. Additionally, as described further below, one or more of secondary television receivers 114 may connect to general network access point 118. For example, secondary television receiver 114-2 may initially connect to a general network via general network access point 118 in order to initiate communications with primary television receiver 110 and thereafter receive instructions for connecting to a private content network via private network access point 112 to begin receiving digital content from primary television receiver 110.

As disclosed above, primary television receiver 110 and secondary television receivers 114 may form a client-server architecture within the at least one local network 121. Each secondary television receiver 114 may operate and stream AN content without communicating directly to a cloud server (e.g., without communicating to a remote system via the network 120). Each secondary television receiver 114 may obtain the majority or all of its content from primary television receiver 110 with which the secondary television receiver 114 is communicatively coupled (e.g., via one or a combination of MoCA, Wi-Fi, Ethernet, and/or the like) in the at least one local network 121. In some examples, each secondary television receiver 114 may obtain OTA updates and smart TV OS-specific file format packages from primary television receiver 110.

While being primarily described in the context of television receivers above, primary television receiver 110 and/or secondary television receivers 114 may represent any number of client/server device configurations and/or relationships for any number of purposes. For example, primary television receiver 110 may include a central or distributed server system within a business environment, such as in a hospital, a warehouse, an office environment, or the like. The server system may then act to distribute data among various client devices.

Additionally, or alternatively, primary television receiver 110 may represent one or more access point controllers configured to control access to one or more private network access points, such as private network access point 112. Controlling access to private network access points may include monitoring the bandwidth and availability of various access points and their respective private networks, as well as controlling and distributing credentials configured to enable client devices, such as secondary television receivers 114, to connect to a particular access point and/or the private network.

In turn, secondary television receivers 114 may be referred to as client devices and/or wireless clients. Client devices may include general and/or special purpose computing devices, such as Internet of Things (IoT) connected devices requiring access to special purpose wired or wireless networks, such as 5G high speed networks. For example, in the context of a hospital, client devices may include various wireless health monitoring devices designed to stream recorded data from one or more sensors over a wireless connection to a central system for processing and monitoring. As another example, in the context of a warehouse, client devices may include one or more device tags designed to transmit object location and/or movement information to a central system for object tracking and monitoring.

Accordingly, while the term "primary television receiver" may be used interchangeably with "access point controller," the remainder of the description will refer to any component configured to control access to network access points as an "access point controller." However, it should be understood that a primary television receiver, such as primary television receiver 110 described above, could perform the functions described in relation to an access point controller and the access point controllers described below may perform any of the functions described in relation to primary television receiver 110 above. Similarly, while the term "secondary television receiver" may be used interchangeably with "wireless client," the remainder of the description will refer to any component configured to receive wireless access to a private network from an access point controller as a "wireless client." However, it should be understood that a secondary television receiver, such as secondary television receivers 114 described above, could perform any functions described in relation to wireless clients, and the wireless clients may perform any of the functions described in relation to secondary television receivers 114 above.

Figure 2:
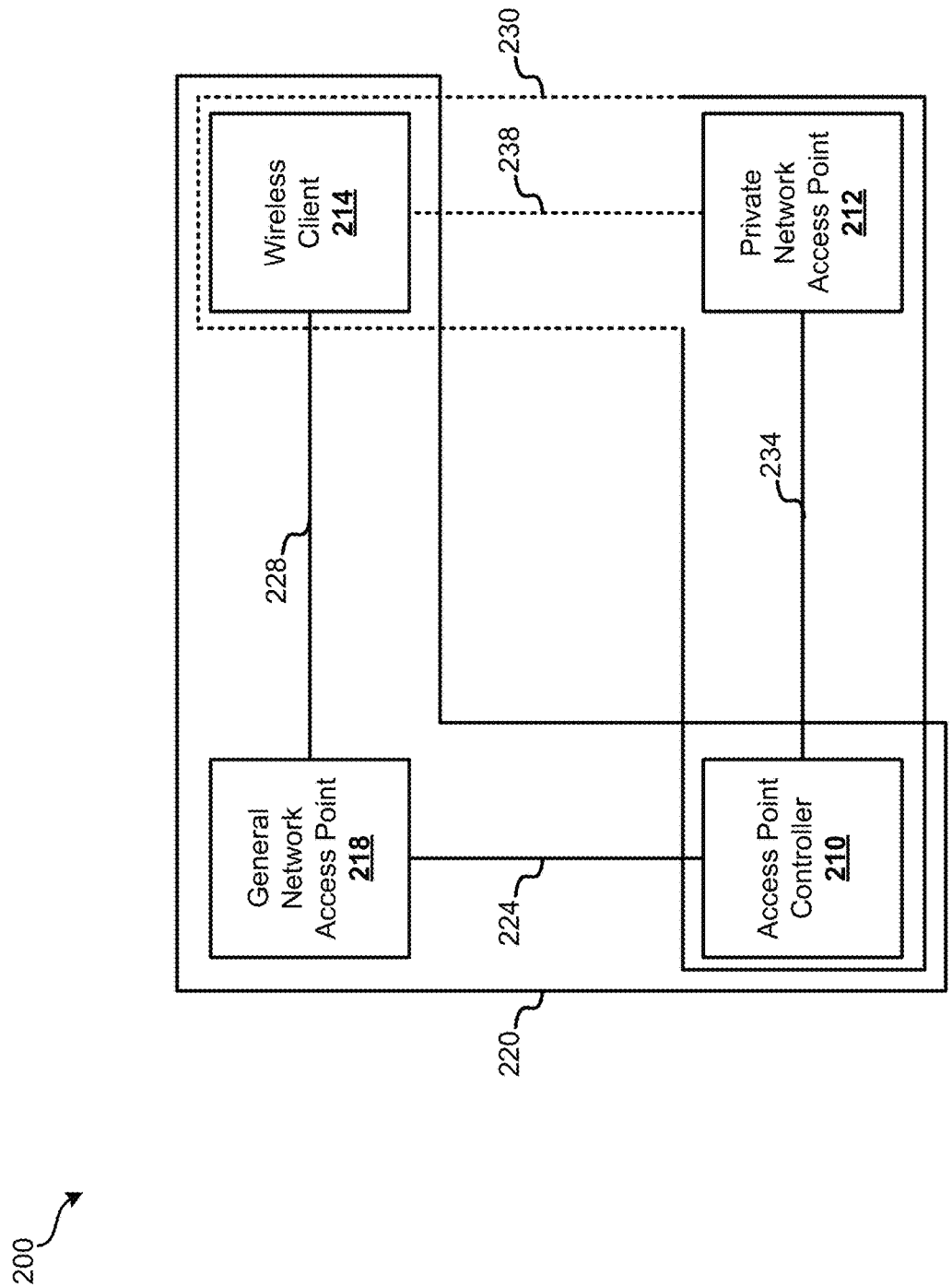
FIG. 2 illustrates an embodiment of private network access by a wireless client in a multi-network communication system.

FIG. 2 illustrates an embodiment of private network access by a wireless client in a multi-network communication system 200. Multi-network communication system 200 includes access point controller 210, private network access point 212, general network access point 218, and wireless client 214. Multi-network communication system 200 may also include one or more additional access point controllers, one or more additional private network access points, one or more additional general network access points, and one or more additional wireless clients, as described further below. Access point controller 210 may be a primary television receiver (such as primary television receiver 110) configured to relay digital content from a service provider (such as service provider(s) 102 described above) to a television for display thereon. Similarly, wireless client 214 may be a secondary television receiver (such as either of secondary television receivers 114) configured to receive the digital content from a primary television receiver and present the digital content at a display, such as a television or computer monitor.

General network access point 218 may be the same, or function in a similar manner, as general network access point 118 described above. For example, general network access point 218 may establish general network 220 and/or manage connections between other devices of multi-network communication system 200 and general network 220. Similarly, private network access point 212 may be the same, or function in a similar manner, as private network access point 112 described above. For example, private network access point 212 may establish private network 230 and/or manage connections between other devices of multi-network communication system 200 and private network 230.

In some embodiments, general network 220 is a general purpose local area network, such as those used in a home or business computing environment for digital communication between electronic devices and/or one or more other networks, such as the Internet. General network access point 218 may provide wired and/or wireless connections to general network 220. For example, wireless client 214 may access general network 220 using a wireless connection 228 provided by general network access point 218. In this example, general network access point 218 may function in the same, or similar fashion, as a wireless router. Alternatively, wireless client 214 may access general network 220 via a wired connection to general network access point 218. Similarly, access point controller 210 may access general network 220 via wired connection 224 with general network access point 218. Wired connection 224 may include an Ethernet or coaxial cable connecting general network access point 218 to access point controller 210.

In some embodiments, general network access point 218 may control access to general network 220 independent of access point controller 210. For example, similar to a Wi-Fi router, general network access point 218 may broadcast a Service Set Identifier (SSID) (e.g., a wireless network name) at one or more wireless frequencies. Client devices, such as wireless client 214 and/or access point controller 210, may then connect to general network 220 using the SSID, a Basic Service Set Identifier (BSSID), and/or additional network credentials, such as Wi-Fi Protected Access (WPA), WPA2, WPA3, Wired Equivalent Privacy (WEP), or other similar network credentials. Alternatively, as described above, client devices may physically connect to general network access point 218 via a wired connection. In some embodiments, general network access point 218 and access point controller 210 may be a part of the same device or service. For example, a combination modem and router device may establish general network 220 and provide access to wireless client 214 via one or more wired connections and/or wireless radios.

In some embodiments, private network 230 is a special purpose local area network configured as a dedicated network for one or more devices to communicate for a particular purpose, such as for television content distribution as described above. Private network access point 212 may provide wired and wireless connections to private network 230. For example, access point controller 210 may access private network 230 via wired connection 234 with private network access point 212. Alternatively, access point controller 210 may establish private network 230 and enable private network access point 212 to provide wireless access to private network 230. For example, wireless client 214 may access private network 230 via wireless connection 238 provided by private network access point 212. In some embodiments, private network access point 212 and access point controller 210 may be a part of the same device or service.

In some embodiments, access point controller 210 controls access to private network 230 and/or any wireless connections to private network access point 212, such as wireless connection 238. For example, access point controller 210 may transmit credentials configured to enable wireless client 214 to access private network 230 via private network access point 212. Access point controller 210 may transmit the credentials in response to receiving a request from wireless client 214 for access to an available private network. For example, after connecting to general network 220, wireless client 214 may broadcast a request for private network credentials via general network access point 218. Access point controller 210 may then receive the request via general network 220 and proceed to determine if it is a valid request. Additionally, or alternatively, access point controller 210 may transmit periodically, or on demand, an identification request via general network 220 for devices to identify themselves over general network 220. Access point controller 210 may then determine an identification sent in response meets one or more criteria for providing access to private network 230.

Determining whether a request is valid may include determining a source type of the device, in this case wireless client 214, from which the request was transmitted. For example, in the case where access point controller 210 is a primary television receiver, as described above, access point controller 210 may determine that wireless client 214 is a secondary television receiver configured to receive digital content from a primary television receiver, and therefore an approved device for connection to private network 230.

Further, access point controller 210 may identify private network 230 as an available private network and/or private network access point 212 as an available access point for private network 230. Identifying private network 230 as an available private network may include a determination that private network 230 has the available bandwidth, address space, signal strength, or other similar network characteristics. Similarly, identifying private network access point 212 as an available access point may include determining that private network access point 212 can support additional connected devices. For example, access point controller 210 may maintain a record of the number of devices currently connected to private network 230 via private network access point 212 and query the record upon receiving the request from wireless client 214. Additionally, or alternatively, access point controller 210 may query, in response to receiving the request, or at periodic intervals, private network access point 212 for the status and/or number of devices connected to private network access point 212. Access point controller may then determine, based on the number of currently connected devices being below a predefined threshold number, that private network access point 212 is available.

Access point controller 210 may transmit the credentials configured to enable wireless client 214 to access private network 230 and/or connect to private network access point 212 via general network 220 and/or general network access point 218. For example, after identifying private network 230 as an available network and/or private network access point 212 as an available access point for private network 230, access point controller 210 may transmit one or more credentials over general network 220 to wireless client 214 in response to the initial request for credentials. The credentials may include identifying information for private network 230, such as a private SSID/BSSID, as well as one or more security and/or authentication tokens, such as a WPA key, or other similar authentication device and/or token.

In some embodiments, access point controller 210 transmits an indication that there are no available private networks or private network access points. For example, while access point controller 210 may identify private network 230 and/or private network access point 212 as potential candidates for wireless client 214, access point controller 210 may determine that either private network 230, private network access point 212, or both, are not available. Determining that a private network and/or private network access point are not available may be based on the same or similar characteristics described above to identify available private networks and/or private network access points. For example, access point controller 210 may determine that the signal strength from private network access point 212 to 214 is not sufficient to support a stable connection. Additionally, or alternatively, access point controller 210 may determine that the number of wireless clients currently accessing private network 230 via private network access point 212 meets or exceeds a threshold number of wireless clients.

After receiving the credentials from access point controller 210, wireless client 214 may proceed to disconnect from general network 220 and initiate wireless connection 238 with private network access point 212. In some embodiments, wireless client 214 may be configured to select between multiple private networks or private network access points before initiating wireless connection 238. For example, as described further below, wireless client 214 may receive credentials for multiple private networks and/or private network access points from one or more access point controllers.

Figure 3:
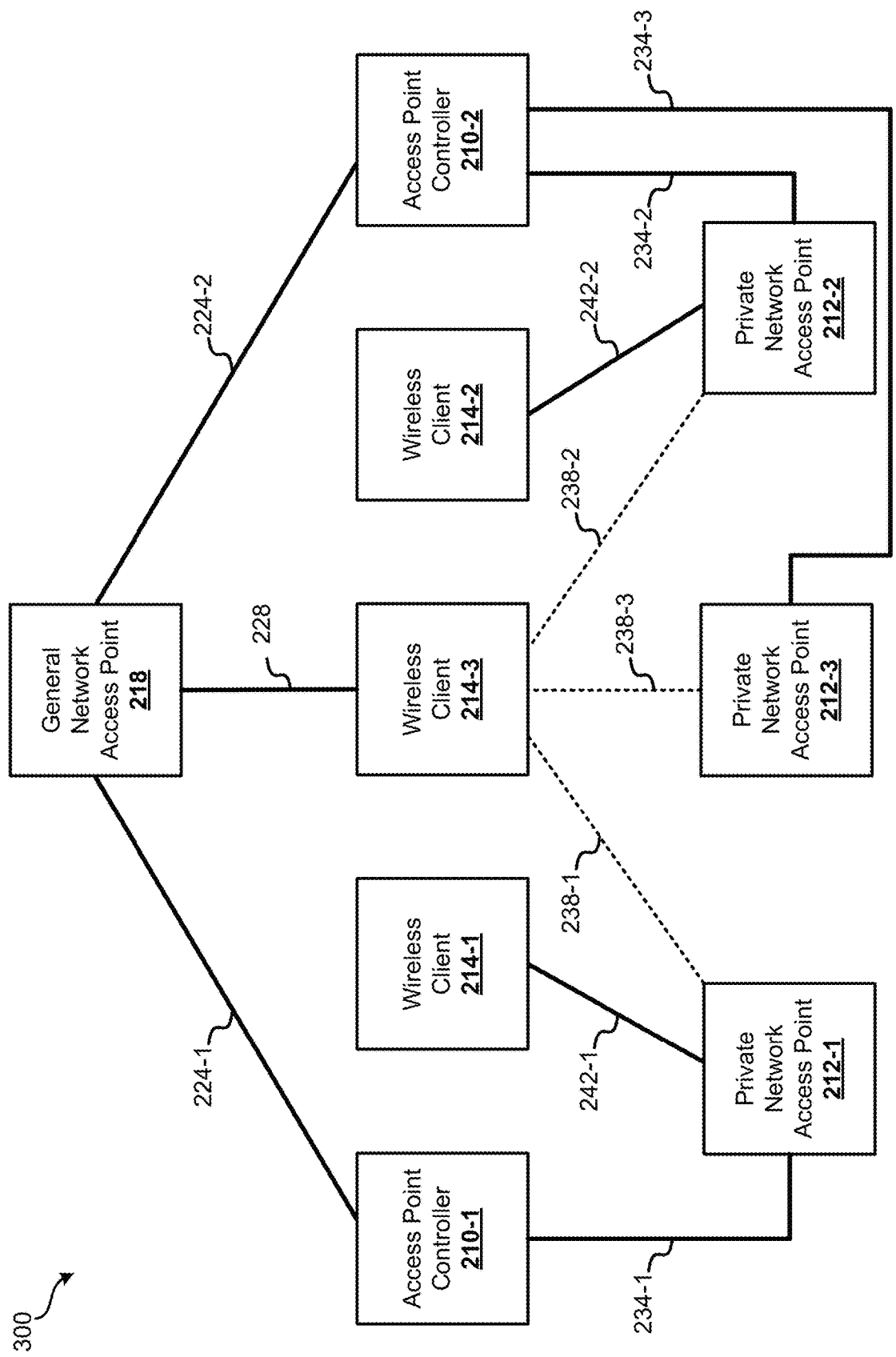
FIG. 3 illustrates an embodiment of private network access point allocation in a multi-network communication system with multiple private network access points and access point controllers.

FIG. 3 illustrates an embodiment of private network access point allocation in a multi-network communication system 300 with multiple private network access points and access point controllers. Multi-network communication system 300 may include the same or similar components as multi-network communication system 200 described above. For example, as illustrated, multi-network communication system 300 includes access point controllers 210, private network access points 212, wireless clients 214, and general network access point 218.

Access point controllers 210 may each be connected to a general network via general network access point 218 as described above. For example, access point controller 210-1 may be connected via wired connection 224-1 with general network access point 218, while access point controller 210-2 may be connected via wireless connection 224-2 with general network access point 218. Further, access point controllers 210 may each be connected to one or more private network access points 212. For example, as illustrated, access point controller 210-1 may be connected to private network access point 212-1 via wired or wireless connection 234-1, while access point controller 210-2 may be connected to both of private network access point 212-2 and private network access point 212-3 via wired or wireless connection 234-2 and wired or wireless connection 234-3 respectively.

In some embodiments, each of private network access points 212 provide access to a separate private network. For example, private network access point 212-1 may provide access to a first private network while private network access point 212-2 and private network access point 212-3 provides access to second and third private networks respectively. Additionally, or alternatively, one or more of private network access points 212 may provide access to a same private network. For example, both private network access point 212-2 and private network access point 212-3 may provide access to a same second private network. In this example, private network access point 212-2 and private network access point 212-3 may operate together in a similar fashion as multiple mesh enabled wireless routers.

In some embodiments, the number of private network access points 212 connected to each of access point controllers 210 may be limited by operational characteristics of access point controllers 210. For example, in the context of primary television receivers, each primary television receiver (e.g., acting as an access point controller) may be able to support a limited number of content streams. The number of content streams may in turn be based on the number of tuners in a primary television receiver. Put differently, the number of private network access points connected to a particular primary television receiver may include up to the same number of tuners or available output streams.

Additionally, or alternatively, the physical resources (e.g., tuners) and/or software resources (e.g., output streams) of a primary television receiver may limit the number of wireless clients 214 (e.g., secondary television receivers) coupled with the primary television receiver via any combination of private network access points. For example, while it may be possible to connect additional private network access points to a primary television receiver, it may not be practical to do so when the number of private network access points exceeds the number of secondary television receivers to which the primary television receiver is able to connect and transmit concurrent streams of digital content. However, there may be alternative reasons for doing so, such as in the case where a primary television receiver may only support a first number of unique television tuner streams and a second number of alternative digital content streams, such as from Internet-based content providers. In this case, the primary television receiver may implement logic to determine the appropriate allocation of resources among the connected devices as the resources are called upon.

Each of private network access points 212 may also be configured to receive and/or provide wireless connections (e.g., access) from wireless clients 214 to their respective private networks. For example, private network access point 212-1 may provide wireless connection 242-1 to wireless client 214-1. Similarly, private network access point 212-2 may provide wireless connection 242-2 to wireless client 214-2. In some embodiments, private network access points 212 support additional wireless connections. For example, as illustrated by potential wireless connection 238, wireless client 214-3 may establish connections to any of private network access point 212-1, private network access point 212-2, or private network access point 212-3.

In some embodiments, access point controllers 210 select which private network access point to which a new wireless client, such as wireless client 214-3, will connect. For example, as described above, after establishing wired or wireless connection 228 between wireless client 214-3 and general network access point 218, wireless client 214-3 may broadcast a request via general network access point 218 for private network credentials. After receiving the request, access point controllers 210 may identify available private network access points 212 as further described above. For example, access point controller 210-2 may identify both private network access point 212-2 and private network access point 212-3 as being available for additional connections by client devices.

In some embodiments, all private network access points connected to an access point controller are identified as available private network access points. Additionally, or alternatively, a subset of the private network access points connected to an access point controller may be identified based on the availability of each private network access point to accept new connections and/or the number of preexisting connections. For example, as illustrated, access point controller 210-2 may initially identify both private network access point 212-2 and private network access point 212-3 as the complete set of private network access points connected to access point controller 210-2. Access point controller 210-2 may then proceed to determine that private network access point 212-2 cannot accept new connections because there is already a connection between private network access point 212-2 and wireless client 214-2 and the maximum number of wireless connections for private network access point 212-2 is set at one wireless connection. It should be understood that, while described as having a maximum number of wireless connections set at one, this is for example only, and private network access points may support more wireless connections, such as 5, 10, 15, or more wireless connections. For example, in a situation where each private network access point 212 supports multiple connections, access point controller 210-2 may identify both of private network access point 212-2 and private network access point 212-3 as available private network access points.

Access point controllers 210 may then apply one or more selection criteria, comparisons, and/or algorithms to determine the best available private network access point. The selection criteria may be based on the private network access point with the greatest available bandwidth, the private network access point with the highest signal strength to the requesting wireless client, the private network access point with the least number of previously connected wireless clients, or other similar selection criteria. Additionally, or alternatively, access point controllers 210 may apply various weights to each factor to derive an overall score for each available private network access point. Access point controllers 210 may then select the private network access point with the highest overall score. For example, access point controller 210-2 may select private network access point 212-3 based, at least in part, on the determination that there are currently no other wireless clients connected to it.

After selecting private network access point 212-3, access point controller 210-2 may proceed to transmit credentials for private network access point 212-3 to wireless client 214-3 via general network access point 218, as described above. On the other hand, access point controller 210-1 may determine that only private network access point 212-1 is available to access point controller 210-1, forego the application of the selection criteria, comparisons, and/or algorithms, and instead proceed to transmit credentials for private network access point 212-1 to wireless client 214-3 via general network access point 218 based on a determination that private network access point 212-1 is available (e.g., can support additional wireless client connections).

In some embodiments, wireless clients 214 apply one or more selection criteria to select the best available private network and/or private network access point 212. For example, in the case described above involving multiple access point controllers 210, wireless client 214-3 may concurrently receive credentials that enable wireless client 214-3 to access private networks via either private network access point 212-1 or private network access point 212-3. In this case, wireless client 214-3 may perform additional analyses to select between private network access point 212-1 and private network access point 212-3. The additional analyses may be based on similar criteria as described above in relation to the selection criteria applied by access point controller 210-2. For example, wireless client 214-3 may compare the relative signal strengths between wireless client 214-3 and each of private network access point 212-1 and private network access point 212-3. Additionally, or alternatively, wireless client 214-3 may compare the relative available bandwidths of private network access point 212-1 and private network access point 212-3.

In some embodiments, the additional characteristics used by wireless clients to select a private network and/or private network access point are provided by the access point controllers. For example, in addition to transmitting the credentials that enable wireless client 214-3 to access a private network via private network access point 212-3, access point controller 210-2 may also transmit network and/or device characteristics associated with private network access point 212-3. After receiving the credentials and characteristics for each available private network and/or private network access point 212, wireless clients 214 may proceed to apply the selection criteria to identify the best available private network and/or private network access point 212.

In some embodiments, a primary access point controller coordinates between multiple access point controllers to select the private network access point by which a new wireless client will connect to a private network. For example, in the case described above involving multiple access point controllers 210, either access point controller 210-1 or access point controller 210-2 may be designated as a primary access point controller. The designation of a primary access point controller may be based on the chronological order in which access point controllers 210 join the general network via general network access point 218. For example, in the case where access point controller 210-1 joins the general network via general network access point 218 first, access point controller 210-1 may first determine that it is the only access point controller currently accessing the general network and designate itself as a primary access point controller.

As subsequent access point controllers join the general network, such as access point controller 210-2, they may determine that there are already one or more access point controllers on the general network and identify the primary access point controller. Alternatively, designating an access point controller as the primary access point controller may occur as subsequent access point controller joins the general network. For example, after access point controller 210-2 joins the general network, access point controller 210-1 and access point controller 210-2 may identify each other as both being on the same general network and apply a selection logic to determine which of them should become the primary access point controller. As subsequent access point controllers join the general network, the selection logic may be applied again to select a new primary access point controller or maintain the existing primary access point controller.

As new wireless clients join the general network, such as wireless client 214-3, the primary access point controller may determine if it, or any other access point controllers, has any available private network access points. For example, each access point controller may monitor the status of each private network access point connected thereto. As the status of a private network access point changes, the access point controller to which it is connected may send an update to the primary access point controller indicating the change in status. Based on the updates from each of the access point controllers, the primary access point controller may maintain a record of the available private network access points. Subsequently, when a new wireless client joins the general network, the primary access point controller may apply the selection criteria described above to select a private network access point from the record of available private network access points to provide to the new wireless client.

Additionally, or alternatively, as new wireless clients join the general network, each access point controller may receive a request for credentials configured to enable the new wireless client to access a private network. The request for credentials may be received from the new wireless client, as described above, or from the primary access point controller. In some embodiments, the request from new wireless clients is initially received by the primary access point controller. The primary access point controller may then forward the request to other available access point controllers and/or generate a new request based on the initial request. In response to receiving the forwarded and/or new request, each access point controller may select the best available private network access point to which it is connected, and/or transmit the credentials, and/or the selection criteria for the selected private network access point, to the primary access point controller. After receiving the responses from each of the access point controllers, the primary access point controller may proceed to apply selection criteria, in a manner similar described above, to select the best available private network access point. Designating one access point controller as a primary access point controller may reduce the complexity and analysis involved from the standpoint of each individual wireless client such that each wireless client can expect to receive only one set of credentials for a private network and proceed to connect to the assigned private network without any additional processing or analysis.

In some embodiments, one or more components of multi-network communication system 300 optimize connections between wireless clients 214 and private network access points 212. Existing wireless connections 242 between wireless clients 214 and private network access points 212 may encounter, or otherwise exhibit, one or more issues requiring further optimization. For example, access point controller 210-1 may detect that wireless connection 242-1 between wireless client 214-1 and private network access point 212-1 is exhibiting signs of a weak connection such as a lower-than-expected signal strength or throughput. This may be the case when, for example, either private network access point 212-1 or wireless client 214-1 have moved and/or are no longer within enough proximity to sustain a stable wireless connection. Additionally, or alternatively, this may occur when there is a physical obstruction between private network access point 212-1 and wireless client 214-1 causing a deterioration in the signal strength. As another example, this may occur when either private network access point 212-1 or wireless client 214-1 become disconnected from a source of power.

After encountering and/or detecting issues with wireless connection 242-1, access point controller 210-1 and/or wireless client 214-1 may take one or more steps to optimize the connection and/or multi-network communication system 300. For example, wireless client 214-1 may automatically attempt to reconnect to the general network via general network access point 218 in order to request new credentials configured to enable wireless client 214-1 to reconnect to a private network via a new private network access point, such as private network access point 212-3. Additionally, or alternatively, wireless client 214-1 may transmit a notification to a display coupled with wireless client 214-1, such as a television, computer monitor, or built-in-display, indicating that wireless connection 242-1 is encountering issues and requesting approval to reconnect via a new private network access point.

As another example, access point controller 210-1 may transmit new credentials to wireless client 214-1 via private network access point 212-1 configured to enable wireless client 214-1 to access the private network via a new private network access point, such as private network access point 212-3 or private network access point 212-2. Additionally, or alternatively, access point controller 210-1 may transmit a notification to a display coupled with access point controller 210-1, or another wireless client, indicating that wireless connection 242-1 is encountering issues and/or no longer accessible, and requesting approval to assign a new private network access point to wireless client 214-1.

In some embodiments, access point controllers 210 and/or wireless clients 214 determine whether a new connection would be beneficial before automatically reconnecting and/or transmitting a notification to a display. For example, after determining that there is an issue with wireless connection 242-1, access point controller 210-1 may identify private network access point 212-2 and/or private network access point 212-3 as potential candidates to which wireless client 214-1 may reconnect. After identifying potential candidates, access point controller 210-1 may then determine whether any of the potential candidate private network access points would provide a stronger and/or more stable connection to wireless client 214-1. For example, access point controller 210-1 may compare the current signal strength received at and/or by wireless client 214-1 from private network access point 212-1 with the expected signal strength of the connections to the potential candidate private network access points. If one or more of the expected signal strengths exceeds a threshold level of improvement, access point controller 210-1 may proceed to automatically reconnect wireless client 214-1 to one of the candidate private network access points, as described above. If, on the other hand, there are no potential candidates, or the expected improvement does not exceed a predefined threshold level of improvement, access point controller 210-1 may do nothing or transmit a notification indicating potential solutions to improve the issues encountered by wireless connection 242-1.

Figure 4:
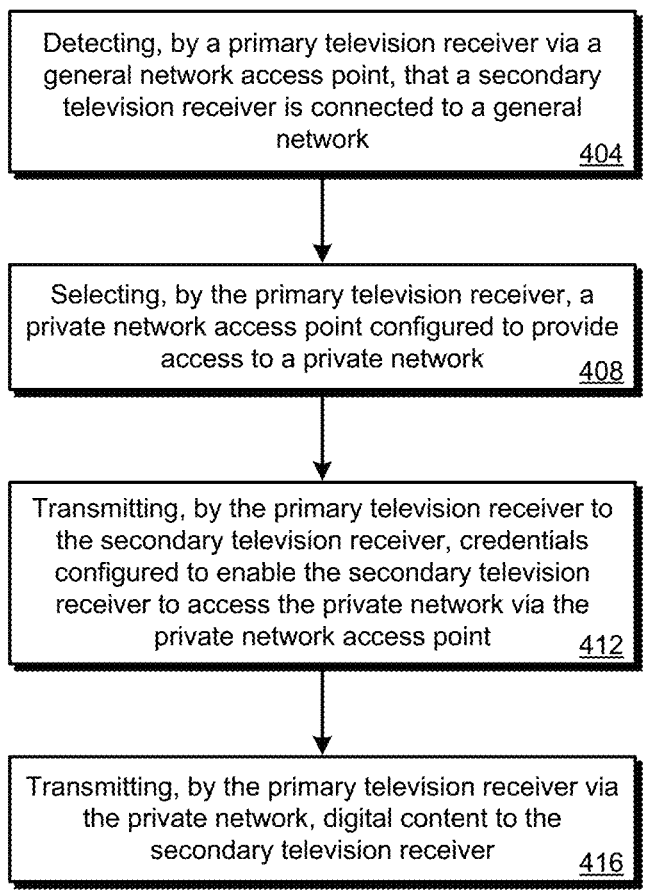
FIG. 4 illustrates an embodiment of a method for facilitating delivery of television content in a multi-network television receiver communication system by a primary television receiver.

Various methods may be performed using the systems and arrangements detailed in relation to FIGS. 1-3. FIG. 4 illustrates an embodiment of a method 400 for facilitating delivery of television content in a multi-network television receiver communication system by a primary television receiver. Method 400 may be performed by one or more components of a multi-network television receiver communication system, such as system 100 described above. For example, one or more blocks of method 400 may be performed by a primary television receiver, such as primary television receiver 110 described above. Additionally, or alternatively, one or more blocks of method 400, and/or additional supporting steps, may be performed by a secondary television receiver, such as either of secondary television receivers 114 described above. While described in relation to television receivers, other devices may perform one or more blocks of method 400. For example, a central server system may control wired and/or wireless access points in a home, business, warehouse, or other similar environment, may perform one or more blocks of method 400.

Method 400 may include, at block 404, detecting, by a primary television receiver via a general network access point, that a secondary television receiver is connected to a general network. The general network access point may be the same, and/or function in a similar manner, as general network access point 118 or general network access point 218 described above. For example, the general network access point may establish a general network and control wired and/or wireless access to the general network by other electronic devices, such as the primary television receiver, the secondary television receiver, personal computers, mobile devices, and other similar electronic devices configured to communicate within a network using a wired and/or wireless connection. Either or both of the primary television receiver and the secondary television receiver may be connected to the general network via the general network access point using a wired or wireless connection, such as via an Ethernet cable, Wi-Fi connection, and the like.

In some embodiments, the primary television receiver detects that the secondary television receiver is connected to the general network by receiving a request or other transmission from the secondary television receiver over the general network. For example, after connecting to the general network, the secondary television receiver may broadcast a transmission to all devices connected to the general network. After receiving and/or decoding the transmission, the primary television receiver may determine that the transmission was sent by a secondary television receiver, indicating that the secondary television receiver is requesting access to a private network.

In some embodiments, multiple primary television receivers detect that the secondary television receiver is connected to the general network. For example, multiple primary television receivers may be connected to the general network when the secondary television receiver broadcasts the transmission across the general network. In some embodiments, only one primary television receiver of the one or more primary television receivers connected to the general network will process the transmission and/or request. For example, a single primary television receiver may be designated as the primary television receiver in control of coordinating private network allocations for secondary television receivers. In this case, while each primary television receiver may receive the initial transmission and/or request, only the designated primary television receiver may respond to and/or otherwise process the transmission and/or request.

At block 408, a private network access point configured to provide access to a private network is selected by the primary television receiver. The private network access point may be the same, and/or function in a similar manner, as private network access point 112 or private network access point 212 described above. For example, the private network access point may establish the private network and provide wired and wireless connections to the private network. Additionally, or alternatively, the private network access point may provide access (e.g., wireless connections) to a private network established and/or maintained by the primary television receiver.

In some embodiments, the primary television receiver selects the private network access point from a plurality of private network access points connected to the primary television receiver. The private network access point may be selected based on one or more selection criteria, as described above. For example, the private network access point may be selected based on the available bandwidth of the private network access point, the expected signal strength from the private network access point to the secondary television receiver, and/or the number of secondary television receivers currently connected to the private network access point.

In some embodiments, the private network access point is connected to a second primary television receiver. For example, in the case where there are multiple primary television receivers connected to the general network, the first primary television receiver may receive information about the private network access point from a second primary television receiver in response to a request for available private network access points connected to the second primary television receiver. The first primary television receiver may transmit the request after receiving the transmission and/or request from the secondary television receiver. This may be the case when, for example, the first primary television receiver is designated as the controlling primary television receiver.

At block 412, credentials configured to enable the secondary television receiver to access the private network via the private network access point are transmitted to the secondary television receiver by the primary television receiver. The credentials may include identifying information for the private network, such as a private SSID, as well as one or more security and/or authentication tokens, such as a WPA key. In some embodiments, the credentials are transmitted to the secondary television receiver via a second primary television receiver. For example, in the case where there are multiple primary television receivers connected to the general network, the primary television receiver may transmit the credentials to a second primary television receiver designated as the controlling primary television receiver. The second primary television receiver may then select the credentials associated with the private network access point from other credentials based on the application of one or more selection criteria as further described above.

At block 416, digital content is transmitted to the secondary television receiver by the primary television receiver via the private network. After the credentials are transmitted to the secondary television receiver, the secondary television receiver may disconnect from the general network and use the credentials to access the private network via the private network access point. Once the secondary television receiver is connected to the private network, the primary television receiver may begin transmitting digital content, such as television, movies, audio, and the like, to secondary television receiver via the private network.

Figure 5:
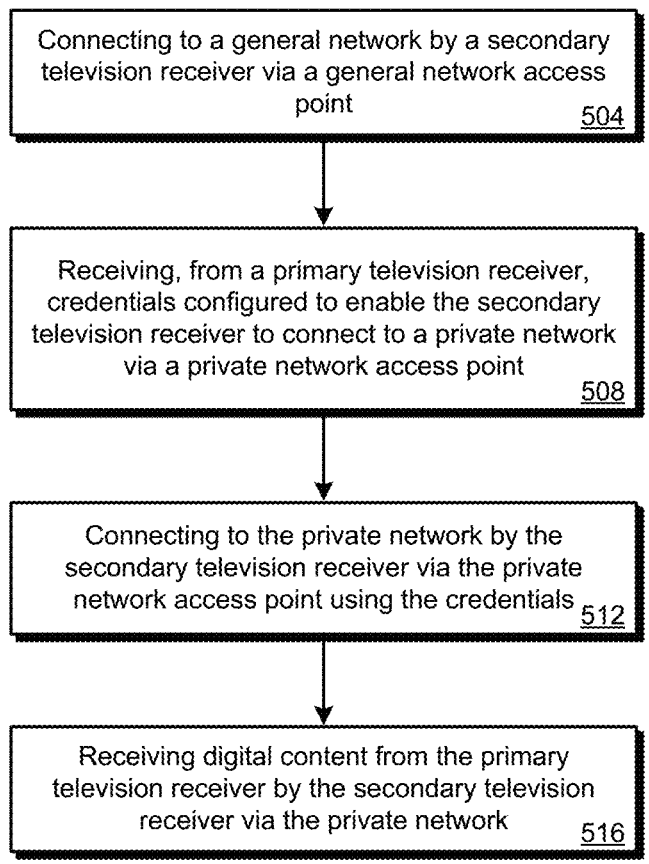
FIG. 5 illustrates an embodiment of a method for facilitating delivery of television content in a wirelessly connected television content receiver system by a secondary television receiver.

FIG. 5 illustrates an embodiment of a method 500 for facilitating delivery of television content in a multi-network television receiver communication system by a secondary television receiver. Method 500 may be performed by one or more components of a multi-network television receiver communication system, such as system 100 described above. For example, one or more blocks of method 500 may be performed by a secondary television receiver, such as either of secondary television receivers 114 described above. Additionally, or alternatively, one or more blocks of method 500, and/or additional background processing, may be performed by a primary television receiver, such as primary television receiver 110 described above. While described in relation to television receivers, other devices may perform one or more blocks of method 500. For example, wireless communication enabled devices, such as personal computers, mobile devices, IoT connected devices, and the like, may perform one or more blocks of method 500.

Method 500 may include, at block 504, connecting to a general network by a secondary television receiver via a general network access point. The general network access point may be the same, and/or function in a similar manner, as general network access point 118 or general network access point 218 described above. For example, the general network access point may establish a general network and control wired and/or wireless access to the general network by other electronic devices, such as the secondary television receiver, personal computers, mobile devices, and other similar electronic devices configured to communicate within a network using a wired and/or wireless connection.

In some embodiments, the secondary television receiver is configured to connect to the general network using one or more user interfaces. For example, the secondary television receiver may present one or more user interfaces at a display communicatively coupled with the secondary television receiver, such as a television, and receive inputs from a remote control device, mouse, keyboard, or other input device. The user interfaces may include one or more user navigable menus or command prompts. For example, a first user interface may include a menu of available general networks, such as Wi-Fi Networks while a second user interface includes a text entry field to receive a password to enable the secondary television receiver to connect to one of the networks, such as the general network.

In some embodiments, after connecting to the general network, the secondary television receiver broadcasts an identification transmission and/or request over the general network. The identification may allow other devices connected to the general network, such as a primary television receiver, to detect that the secondary television receiver has connected to the general network. The request may include a request for available private network credentials configured to enable the secondary television receiver to access a private network via a private network access point.

At block 508, credentials configured to enable the secondary television receiver to connect to a private network via a private network access point are received from a primary television receiver. The private network access point may be the same, and/or function in a similar manner, as private network access point 112 or private network access point 212 described above. For example, the private network access point may establish the private network and provide wired and wireless connections to the private network. Additionally, or alternatively, the private network access point may provide access (e.g., wireless connections) to a private network established and/or controlled by the primary television receiver. The credentials may include identifying information for the private network, such as a private SSID, as well as one or more security and/or authentication tokens, such as a WPA key.

The primary television receiver may transmit the credentials to the secondary television receiver via the general network. For example, in response to receiving the broadcast identification transmission and/or request over the general network, the primary television receiver may transmit the credentials to the secondary television receiver.

In some embodiments, the secondary television receiver receives a plurality of credentials for a respective plurality of private networks and/or private network access points. For example, in the case where there are multiple primary television receivers connected to the general network, each primary television receiver may select and transmit credentials to a best available private network and/or private network access point connected to the respective primary television receiver. Each respective primary television receiver may select the best available private network and/or private network access point by applying one or more selection criterion, as further described above.

At block 512, the secondary television receiver connects to the private network via the private network access point using the credentials. After receiving the credentials from the primary television receiver, the secondary television receiver may disconnect from the general network and use the credentials to access the private network via the private network access point. In some embodiments, the secondary television receiver selects the private network and/or the private network access point from a plurality of private networks and/or private network access points. For example, as described above, the secondary television receiver may receive a plurality of credentials for a respective plurality of private networks and/or private network access points from a plurality of primary television receivers. In this case, the secondary television receiver may apply one or more selection criteria, comparisons, and/or algorithms to select the best available private network and/or private network access point. After identifying the best available private network and/or private network access point, the secondary television receiver may proceed to disconnect from the general network and connect to the private network via the private network access point using the credentials.

At block 516, digital content from the primary television receiver is received by the secondary television receiver via the private network. Once the secondary television receiver is connected to the private network, the secondary television receiver may transmit a request for digital content to the primary television receiver via the private network. In response, the primary television receiver may begin transmitting the requested digital content, such as television, movies, audio, and the like, to the secondary television receiver via the private network. The secondary television receiver may then proceed to present the digital content at a display communicatively coupled with the secondary television receiver, such as a television or computer monitor.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A multi-network television receiver communication system, comprising:
   a general network access point configured to provide access to a general network;
   a first private network access point configured to provide access to a first private network, wherein the first private network and the general network are different networks and wherein credentials for accessing the first private network are distributed by a primary television receiver;
   a secondary television receiver connected to the general network via the general network access point, wherein the secondary television receiver is configured to receive digital media content; and
   a first primary television receiver coupled with the general network access point and the first private network access point, wherein the first primary television receiver is configured to:
      determine that the secondary television receiver is connected to the general network via the general network access point;
      in response to determining that the secondary television receiver is connected to the general network, transmit, to the secondary television receiver via the general network, first credentials configured to enable the secondary television receiver to access the first private network via the first private network access point; and
      transmit, via the first private network, the digital media content to the secondary television receiver.

2. The multi-network television receiver communication system of claim 1, further comprising a plurality of private network access points configured to provide access to a respective plurality of private networks, wherein:
   a first subset of the plurality of private network access points comprises the first private network access point;
   each private network access point of the first subset of the plurality of private network access points is coupled with the first primary television receiver; and
   the first primary television receiver is further configured to:
      receive network characteristics for a respective private network from each private network access point of the first subset of the plurality of private network access points; and
      select, from the first subset of the plurality of private network access points, the first private network access point based on a comparison of the network characteristics received from each private network access point of the first subset of the plurality of private network access points.

3. The multi-network television receiver communication system of claim 2, wherein the network characteristics include at least one network characteristic selected from the group consisting of: a signal strength at the secondary television receiver, a bandwidth of the private network access point, and a number of available connections to the private network access point.

4. The multi-network television receiver communication system of claim 2, further comprising a plurality of primary television receivers, the plurality of primary television receivers comprising the first primary television receiver and a second primary television receiver coupled with the general network access point and a second subset of the plurality of private network access points, wherein the second primary television receiver is configured to:
   determine that the secondary television receiver is connected to the general network via the general network access point; and
   transmit, to the secondary television receiver via the general network in response to detecting that the secondary television receiver is connected to the general network, second credentials configured to enable the secondary television receiver to access a second private network via a second private network access point of the second subset of the plurality of private network access points.

5. The multi-network television receiver communication system of claim 4, wherein:
   the first credentials comprise first network characteristics for the first private network;
   the second credentials comprise second network characteristics for the second private network; and
   the secondary television receiver is further configured to:
      compare the first network characteristics with the second network characteristics using one or more selection criteria to select the first private network;
      disconnect from the general network; and
      connect to the first private network based on the comparison.

6. The multi-network television receiver communication system of claim 1, further comprising a plurality of secondary television receivers configured to receive digital media content from a remote content provider via the first primary television receiver, the plurality of secondary television receivers comprising the secondary television receiver.

7. The multi-network television receiver communication system of claim 1, further comprising a satellite antenna communicatively coupled to the primary television receiver, wherein:
   the satellite antenna is configured to provide a connection between the primary television receiver and a remote content provider; and
   the primary television receiver is further configured to receive the digital media content from the remote content provider.

8. The multi-network television receiver communication system of claim 1, wherein the first primary television receiver comprises the general network access point, the first private network access point, or both.

9. The multi-network television receiver communication system of claim 1, wherein the general network access point is a mobile device configured to provide access to the general network for a temporary time period.

10. The multi-network television receiver communication system of claim 1, further comprising a television communicatively coupled to the secondary television receiver, wherein the secondary television receiver is further configured to display the digital media content from the primary television receiver on the television.

11. A television receiver comprising:
one or more processors; and
a non-transitory computer-readable storage medium storing instructions, which when executed by the one or more processors, cause the one or more processors to:
determine that a secondary television receiver is connected to a general network via a general network access point, wherein the television receiver is coupled with the general network access point;
transmit, to the secondary television receiver via the general network in response to determining that the secondary television receiver is connected to the general network, first credentials configured to enable the secondary television receiver to access a first private network via a first private network access point, wherein the television receiver is coupled with the first private network access point;
receive, from the secondary television receiver via the first private network, a request for digital media content from a remote content provider; and
transmit, via the first private network, the digital media content from the remote content provider to the secondary television receiver.

12. The television receiver of claim 11, wherein the instructions further cause the one or more processors to:
receive network characteristics for respective private networks provided by each private network access point of a plurality of private network access points comprising the first private network access point; and
select the first private network access point based on a comparison of the network characteristics received from each private network access point of the plurality of private network access points.

13. The television receiver of claim 12, wherein the network characteristics are received from a plurality of primary television receivers coupled with the television receiver.

14. The television receiver of claim 11, wherein determining that the secondary television receiver is connected to the general network comprises receiving, from the secondary television receiver via the general network, a request for private network access point credentials.

15. A method of facilitating delivery of television content in a multi-network television receiver communication system, comprising:
connecting to a general network by a secondary television receiver via a general network access point;
determining, by a primary television receiver via the general network, that the secondary television receiver is connected to the general network, wherein the primary television receiver is connected to the general network via the general network access point;
transmitting, from the primary television receiver to the secondary television receiver via the general network, first credentials configured to enable the secondary television receiver to access a first private network via a first private network access point, wherein:
the general network and the first private network are different networks; and
access to the first private network is controlled by the primary television receiver;
connecting, by the secondary television receiver using the first credentials, to the first private network via the first private network access point; and
transmitting digital content from the primary television receiver to the secondary television receiver via the first private network.

16. The method of facilitating delivery of television content in a multi-network television receiver communication system of claim 15, further comprising:
receiving, by the primary television receiver, network characteristics for a respective private network from each of a plurality of private network access points, wherein the plurality of private network access points comprises the first private network access point; and
selecting, from the plurality of private network access points, the first private network access point based on a comparison of the network characteristics received from each private network access point of the plurality of private network access points;
wherein the first credentials configured to enable the secondary television receiver to access the first private network via the first private network access point are transmitted in response to selecting the first private network access point.

17. The method of facilitating delivery of television content in a multi-network television receiver communication system of claim 15, wherein the first credentials comprise first network characteristics for the first private network, the method further comprising:
receiving, by the secondary television receiver via the general network, second credentials configured to enable the secondary television receiver to access a second private network via a second private network access point, wherein the second credentials comprise second network characteristics for the second private network;
comparing, by the secondary television receiver, the first network characteristics with the second network characteristics using one or more selection criteria to select the first private network;
disconnecting, by the secondary television receiver, from the general network; and
connecting, using the first credentials by the secondary television receiver, to the first private network via the first private network access point.

18. The method of facilitating delivery of television content in a multi-network television receiver communication system of claim 17, wherein the second credentials are received from a second primary television receiver.

19. The method of facilitating delivery of television content in a multi-network television receiver communication system of claim 15, further comprising:
receiving the digital content by the primary television receiver from a remote content provider via a satellite antenna.

20. The method of facilitating delivery of television content in a multi-network television receiver communication system of claim 15, further comprising:
transmitting the digital content from the secondary television receiver to a television coupled with the secondary television receiver.

* * * * *